United States Patent
Kim et al.

(10) Patent No.: US 9,178,649 B2
(45) Date of Patent: *Nov. 3, 2015

(54) METHOD AND APPARATUS FOR CONTROLLING LINK MARGIN

(71) Applicant: SAMSUNG ELECTRONICS CO., LTD., Suwon-si (KR)

(72) Inventors: Ho-dong Kim, Gwacheon-si (KR); Hae-young Jun, Seoul (KR); Hyuk-choon Kwon, Seoul (KR); Soo-yeon Jung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/177,095

(22) Filed: Feb. 10, 2014

(65) Prior Publication Data

US 2014/0162569 A1  Jun. 12, 2014

Related U.S. Application Data

(63) Continuation of application No. 12/978,929, filed on Dec. 27, 2010, now Pat. No. 8,688,156.

(60) Provisional application No. 61/293,293, filed on Jan. 8, 2010.

(30) Foreign Application Priority Data

Mar. 15, 2010 (KR) .............................. 2010-0022949

(51) Int. Cl.
*H04L 1/00* (2006.01)
*H04B 7/06* (2006.01)
(Continued)

(52) U.S. Cl.
CPC ............ *H04L 1/0026* (2013.01); *H04B 7/0617* (2013.01); *H04L 1/0003* (2013.01); *H04L 1/0009* (2013.01); *H04W 52/04* (2013.01); *H04W 72/0406* (2013.01); *H04W 72/0473* (2013.01)

(58) Field of Classification Search
CPC ........... H04B 10/07955; H04B 10/275; H04L 1/0003; H04W 28/22; H04W 52/265
USPC ............ 455/63.1, 67.11, 67.13, 114.2, 278.1, 455/296, 522, 13.4; 370/252, 329
See application file for complete search history.

(56) References Cited

U.S. PATENT DOCUMENTS 5,914,944 A * 6/1999 Haugli et al. ................. 370/320
6,275,475 B1 * 8/2001 Emmons, Jr. ................. 370/276
(Continued)

FOREIGN PATENT DOCUMENTS

| EP | 2237441 A2 | 10/2010 |
|---|---|---|
| KR | 10-2002-0084268 A | 11/2002 |
| KR | 10-2008-0005534 A | 1/2008 |

OTHER PUBLICATIONS

Communication from the Korean Intellectual Property Office dated Jan. 19, 2015 in a counterpart Korean application No. 10-2010-0022949.

*Primary Examiner* — Minh D Dao
(74) *Attorney, Agent, or Firm* — Sughrue Mion, PLLC

(57) ABSTRACT

A method and apparatus for controlling a link margin are provided. The method includes: receiving, from a second device, a link margin frame including information about the link margin related to a communication link between a first device and the second device; and performing at least one operation selected from among a change in transmission power, a change in a modulation and coding scheme (MCS), beam forming, and a change of the communication link to another frequency band, based on the received link margin frame.

20 Claims, 4 Drawing Sheets

(51) Int. Cl.
*H04W 52/04* (2009.01)
*H04W 72/04* (2009.01)

(56) References Cited

U.S. PATENT DOCUMENTS

| | | | |
|---|---|---|---|
| 6,590,881 B1 * | 7/2003 | Wallace et al. | 370/332 |
| 6,950,671 B2 * | 9/2005 | Hamabe | 455/522 |
| 7,181,170 B2 * | 2/2007 | Love et al. | 455/67.13 |
| 7,340,267 B2 * | 3/2008 | Budka et al. | 455/522 |
| 7,353,025 B2 * | 4/2008 | Ahn et al. | 455/434 |
| 7,466,157 B2 * | 12/2008 | Miller | 324/750.3 |
| 7,515,913 B2 * | 4/2009 | Hiddink et al. | 455/453 |
| 7,532,895 B2 * | 5/2009 | Hrastar | 455/456.1 |
| 7,933,293 B2 * | 4/2011 | Wentink | 370/473 |
| 8,145,206 B2 * | 3/2012 | Kazmi et al. | 455/423 |
| 8,219,030 B2 * | 7/2012 | Gorokhov et al. | 455/62 |
| 8,688,156 B2 * | 4/2014 | Kim et al. | 455/504 |
| 2005/0030976 A1 | 2/2005 | Wentink | |
| 2005/0227624 A1 * | 10/2005 | Hiddink et al. | 455/62 |
| 2006/0276143 A1 * | 12/2006 | Anglin, Jr. | 455/81 |
| 2008/0261570 A1 * | 10/2008 | Baker et al. | 455/414.1 |
| 2009/0023467 A1 * | 1/2009 | Huang et al. | 455/522 |
| 2010/0238825 A1 * | 9/2010 | Zhang et al. | 370/252 |
| 2010/0290407 A1 * | 11/2010 | Uemura | 370/329 |
| 2011/0105175 A1 * | 5/2011 | Wang et al. | 455/522 |
| 2011/0116407 A1 * | 5/2011 | Ren et al. | 370/252 |
| 2012/0001793 A1 * | 1/2012 | Jacobs et al. | 342/146 |
| 2012/0163213 A1 * | 6/2012 | Sanderford, Jr. | 370/252 |
| 2012/0252468 A1 * | 10/2012 | Gorokhov et al. | 455/447 |
| 2012/0307673 A1 * | 12/2012 | Chang et al. | 370/252 |
| 2013/0028153 A1 * | 1/2013 | Kim et al. | 370/310 |
| 2015/0065190 A1 | 3/2015 | Rudolf et al. | |

\* cited by examiner

FIG. 2

| | CATEGORY | ACTION | DIALOG TOKEN | |
|---|---|---|---|---|
| OCTETS: | 1 | 1 | 1 | |

| | CATEGORY | ACTION | DIALOG TOKEN | LINK MARGIN ELEMENT |
|---|---|---|---|---|
| OCTETS: | 1 | 1 | 1 | 3 |

| | ELEMENT ID | LENGTH | LINK MARGIN |
|---|---|---|---|
| OCTETS: | 1 | 1 | 1 |

| | ELEMENT ID | LENGTH | PREFERENCE ACTION | MCS | LINK MARGIN | ... |
|---|---|---|---|---|---|---|
| OCTETS: | 1 | 1 | 1 | 1 | 1 | 4 |

| | CATEGORY | ACTION | DIALOG TOKEN | PREFERENCE ACTION | LINK MARGIN ELEMENT |
|---|---|---|---|---|---|
| OCTETS: | 1 | 1 | 1 | 1 | 3 |

| | CATEGORY | ACTION | DIALOG TOKEN | UNSOLICITED | LINK MARGIN ELEMENT |
|---|---|---|---|---|---|
| OCTETS: | 1 | 1 | 1 | 1 | 3 |

710, 720, 730, 740, 750 → 700

| | CATEGORY | ACTION | DIALOG TOKEN | DATA FRAME ID | LINK MARGIN ELEMENT |
|---|---|---|---|---|---|
| | 810 | 820 | 830 | 840 | 850 |
| OCTETS: | 1 | 1 | 1 | 2 | 3 |

800

METHOD AND APPARATUS FOR CONTROLLING LINK MARGIN

CROSS-REFERENCE TO RELATED PATENT APPLICATIONS

This is a Continuation of U.S. application Ser. No. 12/978,929, filed Dec. 27, 2010, which claims the benefit of U.S. Provisional Patent Application No. 61/293,293, filed on Jan. 8, 2010 in the U.S. Patent and Trademark Office, and priority from Korean Patent Application No. 10-2010-0022949, filed on Mar. 15, 2010 in the Korean Intellectual Property Office, the disclosures of which are incorporated herein in their entireties by reference.

BACKGROUND

1. Field

Apparatuses and methods consistent with exemplary embodiments relate to a method and apparatus for controlling a link margin.

2. Description of the Related Art

Generally, a link adaptation method of a data communication system increases an entire transmission capacity of the data communication system by changing a modulation and coding scheme (MCS) according to a state of a link via which transmission and receipt are performed.

In this case, a link margin may be used in order to determine the state of the link via which transmission and receipt are performed. In a wireless communication system, the link margin refers to the difference between a receiver's sensitivity and actual received power, and uses decibels (dB) as a unit. For example, if the link margin is 20 dB, the system is capable of accepting an additional attenuation of 15 dB between a transmitting terminal and a receiving terminal.

In a related art, when the state of the link is bad based on the link margin, the link margin is controlled by only changing the MCS.

SUMMARY

One or more exemplary embodiments provide a method and apparatus for controlling a link margin.

According to an aspect of an exemplary embodiment, there is provided a method of controlling a link margin between devices for supporting communication in at least one frequency band, the method including: receiving, from a second device, a link margin response frame including information about the link margin related to a communication link between a first device and the second device; and performing at least one operation selected from among a change in transmission power, a change in a modulation and coding scheme (MCS), beam forming, and a change of the communication link to another frequency band, based on the received link margin response frame.

The method may further include transmitting a link margin request frame for requesting information about the link margin to the second device, wherein the link margin response frame is received in response to the link margin request.

The link margin request frame may include at least one of a category field indicating a kind of a frame to which the link margin request frame belongs, an action field indicating that the link margin request frame is the link margin request frame from among the kind of the frame that is determined by the category field, and a dialog token field including an identifier for identifying the link margin request frame.

The link margin response frame may be periodically received from the second device, or is received based on a calculation result of the link margin related to the communication link calculated in the second device.

The link margin response frame may further include a preference action field indicating an operation preferred by the second device from among the change in transmission power, the change in the MCS, the beam forming, and the change of the communication link to another frequency band.

The link margin response frame may include at least one of a category field indicating a kind of a frame to which the link margin response frame belongs, an action field indicating that the link margin response frame is the link margin response frame from among the kind of the frame that is determined by the category field, a dialog token field indicating whether the link margin response frame is received in response to a link margin request frame for requesting the information about the link margin, and a link margin element field including information about the link margin.

The link margin element field may include at least one of an element identification (ID) field indicating a field including information about the link margin, a length field indicating a length of the link margin element field, and a link margin field in which information about the link margin is recorded.

The link margin response frame may include at least one of a category field indicating a kind of a frame to which the link margin request frame belongs, an action field indicating that the link margin response frame is the link margin response frame from among the kind of the frame that is determined by the category field, a dialog token field including an identifier identifying the link margin response frame, an unsolicited field indicating whether the link margin response frame is received in response to a link margin request frame for requesting information about the link margin, and a link margin element field including information about the link margin.

The link margin response frame may include a data frame ID field including a sequence number of a data frame that is received by the second device before the second device transmits the link margin response frame and is used to calculate the link margin.

According to an aspect of another exemplary embodiment, there is provided an apparatus for controlling a link margin related to a communication link between a first device and a second device in a network including devices for supporting communications in at least one frequency band, the apparatus including: a receiver which receives, from the second device, a link margin response frame including information about the link margin related to the communication link between the first device and the second device; and an operation performing unit which performs at least one operation selected from among a change in transmission power, a change in a modulation and coding scheme (MCS), beam forming, and a change of the communication link to another frequency band, based on the received link margin response frame.

The apparatus may further include a transmitter which transmits a link margin request frame for requesting information about the link margin to the second device, wherein the link margin response frame may be received in response to the transmitted link margin request frame.

According to an aspect of another exemplary embodiment, there is provided a computer readable recording medium having recorded thereon a program for executing the method.

According to an aspect of another exemplary embodiment, there is provided a method of controlling a link margin between devices for supporting communication in at least one frequency band, the method including: receiving, from a second device, a link margin frame comprising information about a link margin related to a communication link between a first device and the second device; and performing at least one operation selected, based on the received link margin frame, from among a plurality of operations to control the link margin.

According to an aspect of another exemplary embodiment, there is provided a method of controlling a link margin between devices for supporting communication in at least one frequency band, the method including: transmitting, to a first device, a link margin frame comprising information about a link margin related to a communication link between the first device and a second device, wherein the link margin frame comprises information used by the first device to select at least one operation to perform from among a plurality of operations to control the link margin.

BRIEF DESCRIPTION OF THE DRAWINGS

The above and/or other aspects will become more apparent by describing in detail exemplary embodiments thereof with reference to the attached drawings in which:

FIG. 2 is a diagram for explaining a structure of a link margin request frame, according to an exemplary embodiment;

FIG. 3 is a diagram for explaining a structure of a link margin response frame, according to an exemplary embodiment;

FIG. 4 is a diagram for explaining a structure of a link margin element field, according to an exemplary embodiment;

FIG. 5 is a diagram for explaining a structure of the link margin element field, according to another exemplary embodiment;

FIG. 6 is a diagram for explaining a structure of a link margin response frame, according to another exemplary embodiment;

FIG. 7 is a diagram for explaining a structure of a link margin response frame, according to another exemplary embodiment;

DETAILED DESCRIPTION OF EXEMPLARY EMBODIMENTS

Figure 1:
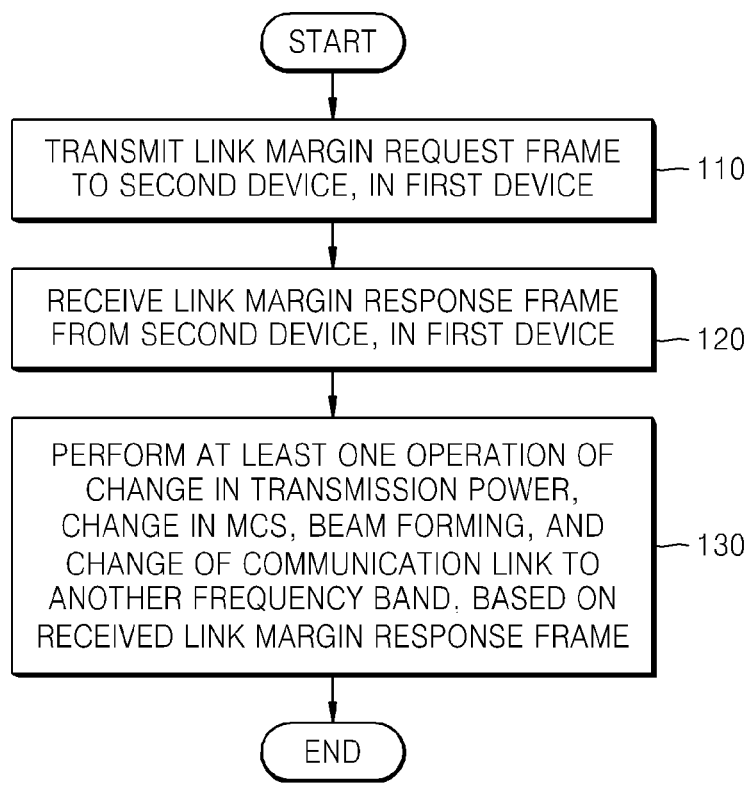
FIG. 1 is a flowchart of a method of controlling a link margin, according to an exemplary embodiment.

Exemplary embodiments will now be described more fully with reference to the accompanying drawings, in which like reference numerals refer to like elements throughout. Expressions such as "at least one of," when preceding a list of elements, modify the entire list of elements and do not modify the individual elements of the list.

FIG. 1 is a flowchart of a method of controlling a link margin, according to an exemplary embodiment.

Hereinafter, a method of controlling a link margin of a communication link of a first device with a second device in a network including the first device and second device for supporting communication in at least one frequency band will be described.

Referring to FIG. 1, in operation 110, the first device transmits a link margin request frame for requesting information about a link margin of a communication link between the first device and the second device to the second device.

For example, the first device and the second device may support communication in 2.4 GHz and 60 GHz frequency bands, communication in 5 GHz and 60 GHz frequency bands, communication in 2.4 GHz, 5 GHz, and 60 GHz frequency bands, communication in the 60 GHz frequency band, etc.

A structure of the link margin request frame according to an exemplary embodiment will be described below with reference to FIG. 2.

In operation 120, the first device receives a link margin response frame including the information about the link margin from the second device.

In this case, the link margin response frame may be received from the second device in response to the link margin request frame transmitted in operation 110.

According to another exemplary embodiment, operation 110 may be omitted. In this case, the first device may not transmit the link margin request frame to the second device, and may receive the link margin response frame from the second device without solicitation.

For example, the second device may periodically transmit the link margin response frame to the first device. In addition, the second device may continuously calculate the link margin of the communication link, and may transmit the link margin response frame to the first device when it is determined that a state of a link is bad according to the calculation result.

The second device may calculate a link margin by using the difference between a signal to noise ratio measured by the second device and a signal to noise ratio appropriate to a modulation and coding scheme (MCS) of data that is currently received, though it is understood that a method of calculating the link margin is not limited thereto.

The structure of the link margin response frame will be described below with reference to FIGS. 3 through 8.

In operation 130, the first device performs at least one of a change in transmission power of the first device, a change in the MCS, beam forming, and a change of communication link to another frequency band, based on the received link margin response frame.

In this case, when the first device determines that the state of the link is bad based on the link margin response frame, the first device may select at least one operation (e.g., the most appropriate operation) from among the change in transmission power of the first device, the change in the MCS, the beam forming, and the change of communication link to another frequency band to control the link margin.

For example, it is assumed that the first device and the second device use a 2.4 or 5 GHz frequency band, and a 60 GHz frequency band. In this case, when the first device performs communication in a 60 Ghz frequency band, if it is determined that the state of a communication link with the second device is bad in the 60 Ghz frequency band, the first device may change the 60 Ghz frequency band to a 2.4 or 5 GHz frequency band by using fast session transfer (FST) technology, and may perform communication accordingly. In addition, when the first device performs communication in a 2.4 or 5 GHz frequency band, if it is determined that the state of a communication link with the second device is bad in the 2.4 or 5 GHz frequency band, the first device may change the 2.4 or 5 GHz frequency band to a 60 GHz frequency band by using FST technology, and may perform communication accordingly. However, the first device may perform at least two operations including an operation of changing the communication link to another frequency band in order to control the link margin. Since the FST technology is described in a WGA specification, a detailed description thereof is omitted herein.

According to the present exemplary embodiment, when it is determined that the state of the link is bad based on the link margin, the link margin may be controlled by using the most appropriate operation from among the change in transmission power of the first device, the change in the MCS, the beam forming, and the change of communication link to another frequency band, and not by using a method of changing the MCS only. Thus, the communication link may be controlled more diversely and effectively than in a related art technology.

According to another exemplary embodiment, the link margin response frame may include information about one operation preferred by the second device from among, for example, the change in transmission power of the first device, the change in the MCS, the beam forming, and the change of communication link to another frequency band. In this case, the first device may perform an operation according to the information about an operation preferred by the second device, included in the link margin response frame, or may perform an operation desired by the first device, regardless of the operation preferred by the second device.

FIG. 2 is a diagram for explaining a structure of a link margin request frame 200, according to an exemplary embodiment.

Referring to FIG. 2, the link margin request frame 200 includes a category field 210, an action field 220, and a dialog token field 230.

The category field 210 indicates a kind of a frame to which the link margin request frame 200 belongs.

For example, the kind of the frame may be classified into a management frame, a control frame, a data frame, etc. Since the link margin request frame 200 is included in the control frame, the category field 210 may indicate that the link margin request frame 200 is a control frame.

The action field 220 indicates that the link margin request frame 200 is the link margin request frame 200 from among the control frame that is determined by the category field 210.

For example, when '8' is recorded in the action field 220, the action field 220 may indicate the link margin request frame 200. When '9' is recorded in the action filed 220, the action field 220 may indicate the link margin response frame.

When the first device transmits the link margin request frame 200 to the second device, the dialog token field 230 includes an identifier for identifying the link margin request frame 200. In this case, the first device may set a predetermined value other than 0 in the dialog token field 230, as an identifier for identifying the link margin request frame 200.

However, it is understood that the structure of the link margin request frame 200 is not limited to FIG. 2. In addition, one or more of the category, action, and dialog token fields 210, 220 and 230 may be omitted, and a new field may be further included.

The structure of a link margin response frame according to exemplary embodiments will now be described with reference to FIGS. 3 through 8.

FIG. 3 is a diagram for explaining a structure of a link margin response frame 300, according to an exemplary embodiment.

Referring to FIG. 3, the link margin response frame 300 includes a category field 310, an action field 320, a dialog token field 330, and a link margin element field 340.

The category field 310 indicates a kind of a frame to which the link margin request frame 300 belongs.

In FIG. 3, the category field 310 indicates that the link margin response frame 300 is a control frame.

The action field 320 indicates that the link margin response frame 300 is the link margin response frame 300 from among the control frame that is the kind of the frame determined by the category field 310

The dialog token field 330 may indicate whether the link margin response frame 300 is received in response to a link margin request frame 200 for requesting information about the link margin.

For example, when the link margin response frame 300 is received in response to the link margin request frame 200, a predetermined value other than '0' may be recorded in the dialog token field 330. In addition, when the link margin response frame 300 is received without transmitting the link margin request frame 200, '0' may be recorded in the dialog token field 330. However, it is understood that a value recorded in the dialog token field 330 is not limited to the above-described values, and values determined according to a situation may be recorded in the dialog token field 330.

The link margin element field 340 includes information about the link margin.

The structure of the link margin element field 340 will be described with reference to FIGS. 4 and 5.

FIG. 4 is a diagram for explaining a structure of a link margin element field 340, according to an exemplary embodiment.

Referring to FIG. 4, the link margin element field 340 includes a element identification (ID) field 342, a length field 344, and a link margin field 346.

The element ID field 342 indicates that the link margin element field 340 is a field including information about a link margin.

The length field 344 indicates a length of the link margin element field 340.

Information about a link margin calculated by the second device is recorded in the link margin field 346.

FIG. 5 is a diagram for explaining a structure of the link margin element field 340, according to another exemplary embodiment.

Referring to FIG. 5, the link margin element field 340 includes the element ID field 342, the length field 344, a preference action field 343, a MCS field 345, and a link margin field 345.

The element ID field 342 indicates that the link margin element field 340 is a field including information about a link margin.

The length field 344 indicates a length of the link margin element field 340.

The preference action field 343 indicates an operation preferred by the second device from among, for example, the change in transmission power, the change in the MCS, the beam forming, and the change of communication link to another frequency band.

For example, when '0' is recorded in the preference action field 343, there is no operation preferred by the second device. When '1' is recorded in the preference action field 343, an operation preferred by the second device is the change in the MCS. When '2' is recorded in the preference action field 343, the operation preferred by the second device is the change in transmission power. When '3' is recorded in the preference action field 343, the operation preferred by the second device is the change of communication link to another frequency band, that is, FST.

As described above, when the first device receives the link margin response frame 300, including the preference action field 343, the first device may perform an operation according to the second device's preference indicated in the preference action field 343 or may perform an operation desired by the first device, regardless of the operation preferred by the second device.

When the operation preferred by the second device is to change the MCS, the MCS field 345 indicates the MCS value to be changed.

Information about a link margin calculated by the second device is recorded in the link margin field 346. For example, the second device may calculate the link margin from data frames received from the first device, and the calculation result may be recorded in the link margin field 346.

FIG. 6 is a diagram for explaining a structure of a link margin response frame 600, according to another exemplary embodiment.

Referring to FIG. 6, the link margin response frame 600 includes a category field 610, an action field 620, a dialog token field 630, a preference action field 640, and a link margin element field 650.

The category field 610 indicates a kind of frame to which the link margin response frame 600 belongs. In FIG. 6, the category field 610 may indicate that the link margin response frame 600 is a control frame.

The action field 620 indicates that the link margin response frame 600 is the link margin response frame 600 from among the control frame that is the kind of the frame determined by the category field 610.

When the second device transmits the link margin response frame 600 to the first device, the dialog token field 630 includes an identifier for identifying the link margin response frame 600.

In this case, an identifier recorded in the dialog token field 230 of a link margin request frame 200 corresponding to the link margin response frame 600 may be recorded in the dialog token field 630. Accordingly, the dialog token field 230 indicates that the link margin response frame 600 is the link margin response frame 600 corresponding to the link margin request frame 200. For example, when the second device receives the link margin request frame 200 in which '1' is recorded in the dialog token field 230 from the first device, the second device transmits the link margin response frame 600 in which '1' is recorded in the dialog token field 630, and thus it may be indicted that the link margin response frame 600 transmitted from the second device to the first device corresponds to the link margin request frame 200 in which '1' is recorded in the dialog token field 230.

In addition, when the link margin response frame 600 is not transmitted in response to the link margin request frame 200, '0' may be recorded in the dialog token field 630.

However, it is understood that a value recorded in the dialog token field 630 is not limited to the above-described values, and other values determined according to a situation may be recorded in the dialog token field 630.

The preference action field 640 indicates an operation preferred by the second device from among, for example, the change in transmission power, the change in the MCS, the beam forming, and the change of communication link to another frequency band.

In this case, comparing the link margin response frame 600 of FIG. 6 and the link margin response frame 300 of FIG. 3, the preference action field 640 is not included in the link margin response frame 300 of FIG. 3, but the preference action field 343 may be included in the link margin element field 340 of FIG. 3, like in FIG. 5. Thus, both of the link margin response frame 300 of FIG. 3 and the link margin response frame 600 of FIG. 6 may include the preference action fields 343 and 640, respectively, but locations where the preference action fields 343 and 640 are included are different.

The link margin element field 650 includes information about a link margin.

FIG. 7 is a diagram for explaining a structure of a link margin response frame 700, according to another exemplary embodiment.

Referring to FIG. 7, the link margin response frame 700 includes a category field 710, an action field 720, a dialog token field 730, an unsolicited field 740, and a link margin element field 750.

In this case, the category field 710, the action field 720, the dialog token field 730, and the link margin element field 750 perform the same operations as those of the category field 610, the action field 620, the dialog token field 630 and the link margin element field 650 of the link margin response frame 600 of FIG. 6, respectively, and thus detailed descriptions thereof are omitted herein.

The unsolicited field 740 indicates whether the link margin response frame 700 is received in response to the link margin request frame 200.

For example, when the link margin response frame 700 is received in response to the link margin request frame 200, '0' may be recorded in the unsolicited field 740. When the link margin response frame 700 is received without transmitting the link margin request frame 200, a predetermined value other than '0' may be recorded in the unsolicited field 740. However, it is understood that a value recorded in the unsolicited field 740 is not limited to the above-described values, and other values determined according to a situation may be recorded in the unsolicited field 740.

Figures 8, 9:
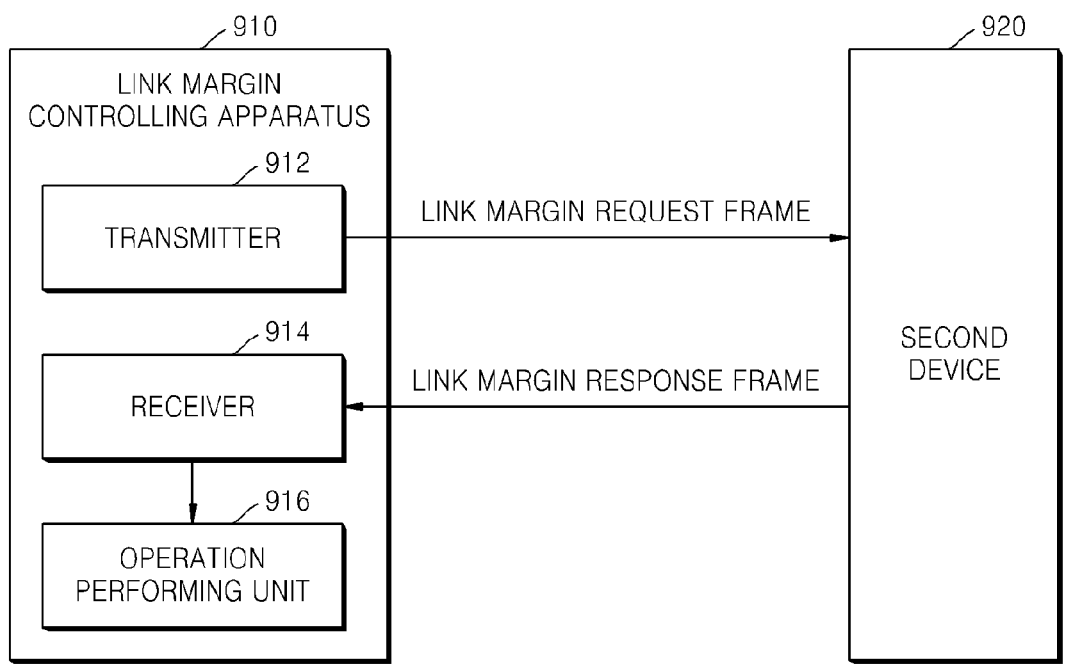
FIG. 8 is a diagram for explaining a structure of a link margin response frame, according to an exemplary embodiment.
FIG. 9 is a block diagram for explaining a link margin controlling apparatus according to an exemplary embodiment.

FIG. 8 is a diagram for explaining a structure of a link margin response frame 800, according to an exemplary embodiment.

Referring to FIG. 8, the link margin response frame 800 includes a category field 810, an action field 820, a dialog token field 830, a data frame ID field 840, and a link margin element field 850.

In this case, the category field 810, the action field 820, the dialog token field 830, and the link margin element field 850 perform the same operations as those of the category field 610, the action field 620, the dialog token field 630, and the link margin element field 650 of the link margin response frame 600 of FIG. 6, respectively, and thus detailed descriptions thereof are omitted herein.

The data frame ID field 840 includes a sequence number of a data frame that is received by the second device before the second device transmits the link margin response frame 800 and is used to calculate the link margin.

The second device allows the first device receiving the link margin response frame 800 to determine a point of time for calculating the link margin by using a sequence number of the data frame used to calculate the link margin, and thus helps in appropriately controlling the state of the communication link.

According to another exemplary embodiment, the number of a data frame that is retransmitted from the first device to the second device may be recorded in the data frame ID field 840, and the link margin may be calculated using information about the number of the data frame.

According to another exemplary embodiment, the data frame ID field 840 may include a sequence number field (not shown) in which a sequence number of the data frame is recorded, and a reservation field (not shown).

Octet numbers and bit numbers for respective fields are indicated in FIGS. 2 through 8, though it is understood that another exemplary embodiment is not limited thereto.

FIG. 9 is a block diagram for explaining a link margin controlling apparatus 910 according to an exemplary embodiment.

Referring to FIG. 9, the link margin controlling apparatus 910 includes a transmitter 912, a receiver 914, and an operation performing unit 916. In this case, it is assumed that the link margin controlling apparatus 910 is in a first device (not shown). For convenience of description, a second device 920 is further illustrated. In addition, it is assumed that the first device and the second device 920 may each support communication in at least one frequency band.

The transmitter 912 transmits a link margin request frame for requesting information about a link margin to the second device 920.

According to another exemplary embodiment, the transmitter 912 may be omitted or the transmitter 912 may not transmit the link margin request frame.

The receiver 914 receives a link margin response frame including information about a communication link between the link margin controlling apparatus 910 and the second device 920 from the second device 920.

In this case, the link margin response frame may be received in response to the link margin request frame, or may be received from the second device 920 without transmitting the link margin request frame.

The operation performing unit 916 performs at least one of a change in transmission power of the first device, a change in the MCS, beam forming, and a change of communication link to another frequency band, based on the received link margin response frame.

While not restricted thereto, an exemplary embodiment can be written as computer programs and can be implemented in general-use digital computers that execute the programs using a computer readable recording medium. Examples of the computer readable recording medium include magnetic storage media (e.g., ROM, floppy disks, hard disks, etc.), and storage media such as optical recording media (e.g., CD-ROMs, or DVDs). Furthermore, one or more units of the link margin controlling apparatus 910 can include a processor or microprocessor executing a computer program stored in a computer-readable medium.

While exemplary embodiments have been particularly shown and described above, it will be understood by those of ordinary skill in the art that various changes in form and details may be made therein without departing from the spirit and scope of the present inventive concept as defined by the following claims.

What is claimed is:

1. A method of controlling a link margin between devices for supporting communication in at least one frequency band, the method comprising:
   receiving, from a second device, a link margin frame comprising information about a link margin related to a communication link between a first device and the second device; and
   performing at least one operation selected from among a change in a modulation and coding scheme (MCS) and a change of the communication link to another frequency band, based on the received link margin frame.

2. The method of claim 1, further comprising:
   transmitting a link margin request frame for requesting information about the link margin to the second device, wherein the link margin frame is a link margin response frame received in response to the transmitted link margin request frame.

3. The method of claim 2, wherein the link margin request frame comprises at least one of a category field indicating a kind of a frame to which the link margin request frame belongs, an action field indicating that the link margin request frame is a link margin request frame from among the kind of the frame that is determined by the category field, and a dialog token field comprising an identifier identifying the link margin request frame.

4. The method of claim 1, wherein the link margin frame is periodically received from the second device, or is received based on a calculation result of the link margin related to the communication link calculated in the second device.

5. The method of claim 1, wherein the link margin frame further comprises a preference action field indicating an operation preferred by the second device from among change in transmission power, the change in the MCS, beam forming, and the change of the communication link to another frequency band.

6. The method of claim 5, wherein the link margin frame comprises at least one of a category field indicating a kind of a frame to which the link margin frame belongs, an action field indicating that the link margin frame is the link margin frame from among the kind of the frame that is determined by the category field, a dialog token field indicating whether the link margin frame is received in response to a link margin request frame for requesting the information about the link margin, and a link margin element field comprising information about the link margin.

7. The method of claim 6, wherein the dialog token field comprises a value corresponding to a value of a dialog token field comprised in the link margin request frame.

8. The method of claim 6, wherein the link margin element field comprises at least one of an element identification (ID) field indicating a field comprising information about the link margin, a length field indicating a length of the link margin element field, and a link margin field in which information about the link margin is recorded.

9. The method of claim 5, wherein the link margin frame further comprises a data frame ID field comprising a sequence number of a data frame that is received by the second device before the second device transmits the link margin frame and is used to calculate the link margin.

10. The method of claim 1, wherein the link margin frame comprises at least one of a category field indicating a kind of a frame to which the link margin frame belongs, an action field indicating that the link margin frame is the link margin frame from among the kind of the frame that is determined by the category field, a dialog token field comprising an identifier identifying the link margin frame, an unsolicited field indicating whether the link margin frame is received in response to a link margin request frame for requesting information about the link margin, and a link margin element field comprising information about the link margin.

11. A computer readable recording medium having recorded thereon a program for executing the method of claim 1.

12. An apparatus for controlling a link margin related to a communication link between a first device and a second device in a network comprising devices for supporting communications in at least one frequency band, the apparatus comprising:
   a receiver which receives, from the second device, a link margin frame comprising information about the link margin related to the communication link between the first device and the second device; and
   an operation performing unit which performs at least one operation selected from among a change in a modulation and coding scheme (MCS) and a change of the communication link to another frequency band, based on the received link margin frame.

13. The apparatus of claim 12, further comprising:
a transmitter which transmits a link margin request frame for requesting information about the link margin to the second device,
wherein the link margin frame is a link margin response frame received in response to the transmitted link margin request frame.

14. The apparatus of claim 13, wherein the link margin response frame comprises at least one of a category field indicating a kind of a frame to which the link margin request frame belongs, an action field indicating that the link margin request frame is a link margin request frame from among the kind of the frame that is determined by the category field, and a dialog token field comprising an identifier identifying the link margin request frame.

15. The apparatus of claim 12, wherein the link margin frame is periodically received from the second device, or is received based on a calculation result of the link margin related to the communication link calculated in the second device.

16. The apparatus of claim 12, wherein the link margin frame further comprises a preference action field indicating an operation preferred by the second device from among a change in transmission power, the change in the MCS, beam forming, and the change of the communication link to another frequency band.

17. The apparatus of claim 16, wherein the link margin frame comprises at least one of a category field indicating a kind of a frame to which the link margin frame belongs, an action field indicating that the link margin frame is the link margin frame from among the kind of the frame that is determined by the category field, a dialog token field for indicating whether the link margin frame is received in response to a link margin request frame for requesting the information about the link margin, and a link margin element field comprising information about the link margin.

18. The apparatus of claim 17, wherein the link margin element field comprises at least one of an element identification (ID) field indicating a field comprising information about the link margin, a length field indicating a length of the link margin element field, and a link margin field in which information about the link margin is recorded.

19. The apparatus of claim 17, wherein the link margin frame further comprises a data frame ID field comprising a sequence number of a data frame that is received by the second device before the second device transmits the link margin frame and is used to calculate the link margin.

20. The apparatus of claim 12, wherein the link margin frame comprises at least one of a category field indicating a kind of a frame to which the link margin frame belongs, an action field for indicating that the link margin frame is the link margin frame from among the kind of the frame that is determined by the category field, a dialog token field comprising an identifier identifying the link margin frame, an unsolicited field indicating whether the link margin frame is received in response to a link margin request frame for requesting information about the link margin, and a link margin element field comprising information about the link margin.

* * * * *